Patented Jan. 22, 1946

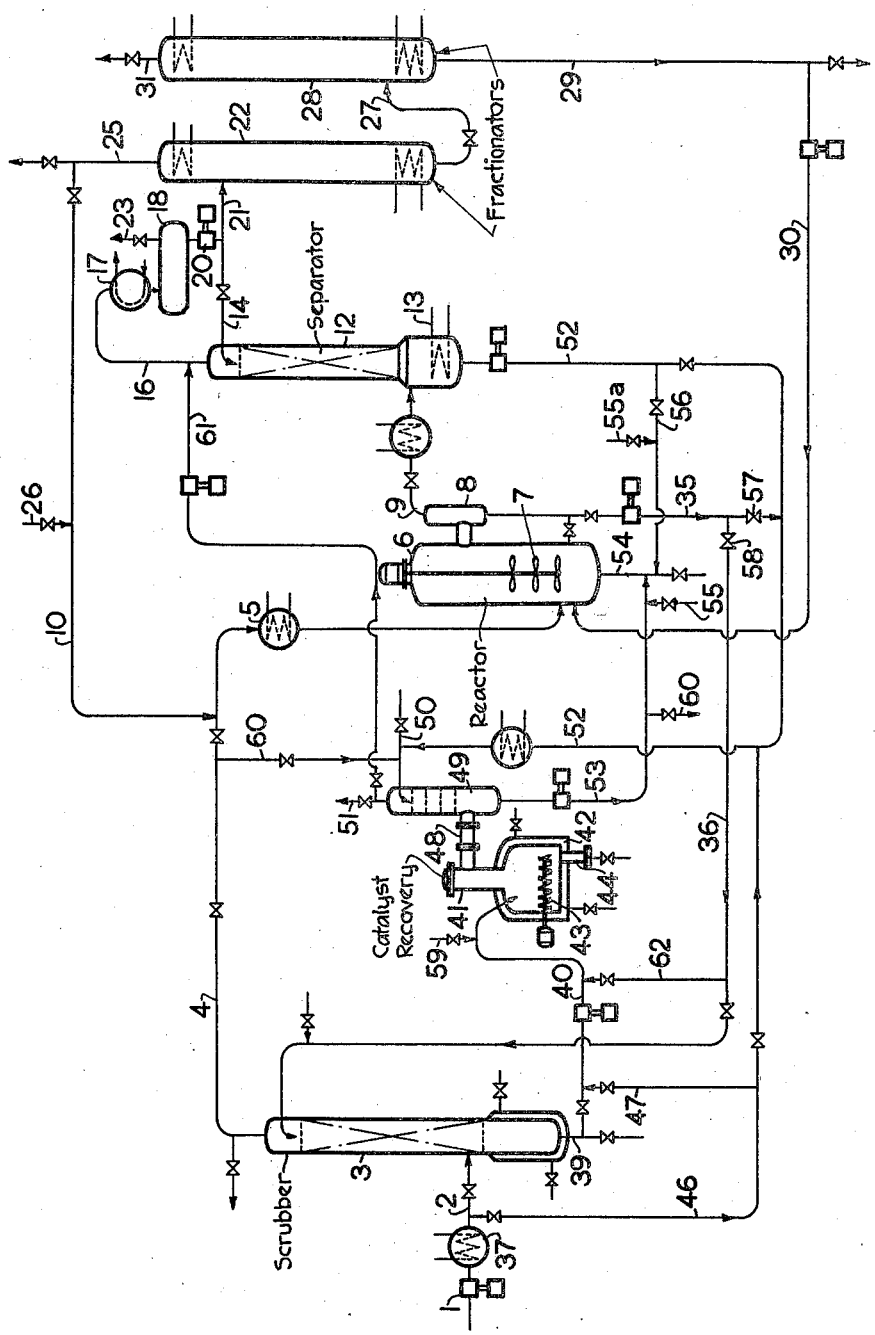

2,393,569

UNITED STATES PATENT OFFICE 2,393,569

CATALYTIC HYDROCARBON CONVERSION PROCESS

William E. Ross, Berkeley, and George J. Carlson, El Cerrito, Calif., assignors to Shell Development Company, San Francisco, Calif., a corporation of Delaware Application March 1, 1944, Serial No. 524,820

10 Claims. (Cl. 260—683.5)

This invention relates to the execution of catalytic reactions and/or treatments with the aid of catalysts or contact materials comprising a metal halide of the Friedel-Crafts type and relates more particularly to the execution of hydrocarbon conversions and treatments wherein hydrocarbons are contacted with catalysts and/or contact materials comprising a halide of aluminum.

Catalysts and contact materials comprising metal halides of the Friedel-Crafts type are finding ever-increasing application in processes directed to the practical execution of many widely varying types of catalytic reactions and treatments. Of these catalysts and contact materials those comprising a halide of aluminum, for example, aluminum chloride, aluminum bromide, etc., are of particular practical importance in the treatment or conversion of hydrocarbons or hydrocarbon-containing materials. Catalytic hydrocarbon conversion processes in which they are applied to advantage comprise, among others, those involving isomerization, alkylation, polymerization and condensation reactions. The nature of the particular catalyst or contact material comprising the aluminum halide and the manner in which it is employed will vary with the particular process. Although in certain processes it is used in a solid form and in other processes may be used in either a solid or fluid form, in a great number of processes, particularly among those of recent development, it is often highly advantageous and sometimes essential that the catalyst used be of a fluid type. Available fluid type catalysts or contact materials vary considerably from one another. The fluid type catalyst may comprise the aluminum halide as a suspension or a solution in a suitable liquid vehicle. The liquid vehicle may comprise a hydrocarbon or hydrocarbon mixture which may be a part or all of the materials treated. Other carrying liquids may comprise a hydrogen halide such as HCl; alkyl halides; $SO_2$; or any other liquids inert at the operating conditions.

Another type of fluid aluminum halide-containing catalyst comprises the aluminum halide as a solution or suspension in a suitable molten salt or mixture of molten salts. The molten salts may simply function as the carrying medium or they may act as a catalyst modifier or as a separate catalyst component to form a true mixed molten salt catalyst. Suitable salts which may be combined with the aluminum halide to provide a fluid molten salt type catalyst comprise, for example, a halide of one or more of the following: As, Zr, Nb, Mo, Pd, Sn, Sb, Hf, Ta, W, Tl, Pb, Bi, U, Zn and the alkali and alkaline earth metals. Particularly suitable molten salt type aluminum halide-containing catalysts comprise a molten mixture of aluminum halide and a halide of antimony, for example, a melt comprising $AlCl_3$ dissolved in $SbCl_3$; a molten mixture of aluminum halide and at least one halide salt of an alkali or alkaline earth metal.

Still another type of fluid aluminum halide-containing catalysts comprises a fluid organo-aluminum halide complex. The fluid complex catalysts may be prepared by mixing an aluminum halide, for example, aluminum chloride and/or aluminum bromide, with an organic compound under suitable conditions resulting in the interaction of the aluminum halide with the organic compound and/or decomposition products thereof. Suitable organic compounds with which the aluminum halide may be combined under conditions resulting in the obtaining of a desired organo-aluminum halide complex comprise, for example, aromatic hydrocarbons, such as benzene, toluene; hydrocarbon fractions, such as an aromatic kerosene extract; cyclic olefins, such as cyclohexene, cyclopentene and alkyl derivatives thereof; paraffinic and olefinic hydrocarbons of straight or branched chain structure; phenols; organic acids; ethers, etc. In the preparation of the complex, the organic compound and the admixed metal halide are subjected to elevated temperatures, for example, not substantially in excess of about 150° C., generally in the presence of an added hydrogen halide for a sufficient length of time to result in the formation of a liquid or sludge consisting essentially of only an organo-aluminum halide complex.

It is to be pointed out, however, that the invention is in no wise limited to the use of a particular type of catalyst comprising a metal halide of the Friedel-Crafts type, nor by the method of its preparation.

In carrying out the process with the aid of these catalysts the catalyst and hydrocarbon, or hydrocarbon mixture, to be converted or treated are passed countercurrently, generally in the presence of an added hydrogen halide, through a reaction zone maintained under operating conditions defined by the particular reaction to be favored. In other methods of operation the reactants are bubbled through, or otherwise subjected to intimate contact, with a catalyst mass in a reaction zone of enlarged cross-sectional area. Separation of catalyst from reactor effluence is generally resorted to in a suitable catalyst separating zone and at least a portion of the thus separated catalyst recycled to the reaction zone.

At least partly spent catalyst or catalyst residue, consisting predominantly of a sludgy organo-aluminum halide complex is generally drawn from the system at one or several points thereof which may comprise the reaction zone, catalyst separating zone and fractionating system. This results in the continuous production and accumulation of a considerable amount of aluminum halide-containing, at least partly spent, catalyst or catalyst residue. In such processes efficient operation on a practical scale generally precludes the utilization of the catalyst until all of the aluminum halide has been completely expended and continuous or intermittent regeneration, and/or readjustment of catalyst, must generally be relied upon to maintain the catalyst activity at a practical level. This involves the further substantially continuous separation and production of considerable amounts of relatively inactive aluminum halide-containing sludge. In certain types of operations wherein catalysts consisting essentially of molten salt mixtures comprising the aluminum halide are used, the presence of even relatively small proportions of sludge considerably reduces the activity of the catalyst and continuous sludge removal must then be resorted to to maintain the catalyst at a sufficiently high level of catalyst activity to assure efficient operation of the process. This again results in a considerable accumulation of at least partly spent catalyst containing considerable proportions of catalyst components. Feasibility of practical operation of a process employing these catalysts is generally dependent upon the recovery, to at least a substantial degree, of the aluminum halide content of the thus continuously accumulated inactive sludge or at least partly spent catalyst. Methods available heretofore have been not only cumbersome and costly but seldom enable substantially complete recovery of the active catalyst component from the discarded at least partially spent catalyst or catalyst residue, thereby detracting considerably from the efficiency of the operation.

Separation of the uncombined aluminum halide from the sludge may be effected to at least a substantial degree by scrubbing with a suitable solvent such as, for example, a paraffinic hydrocarbon in which free catalyst components, such as aluminum halides, possess appreciable solubility but in which the sludge, consisting essentially of organo-aluminum halide complexes, is generally relatively insoluble. The greater proportion of the aluminum halide in the sludge is, however, in the form of the organo-metal halide complex from which it cannot be freed by mere solvent treatment. Attempts to destructively distill the residue by methods resorted to heretofore are not only cumbersome but present acute difficulties in recovery of substantially all of the aluminum halide and particularly in its return into the system.

It is an object of the present invention to provide an improved process for the more efficient execution of catalytic reactions with the aid of metal halides of the Friedel-Crafts type, wherein the metal halide is efficiently and continuously recovered within the system.

Another object of the invention is the provision of an improved process for the more efficient execution of hydrocarbon conversions with the aid of catalysts comprising an aluminum halide, wherein the aluminum halide is efficiently and continuously recovered within the system.

Another object of the invention is the provision of a process for the more efficient execution of catalytic hydrocarbon conversions with the aid of fluid catalysts comprising a mixture of molten salts comprising a metal of the Friedel-Crafts type, wherein catalyst components are efficiently and continuously recovered with the system.

Another object of the invention is the provision of an improved process for the more efficient conversion of hydrocarbons with the aid of fluid catalyst melts comprising a halide of aluminum, wherein catalyst components are efficiently and continuously recovered within the system.

A further object of the invention is the provision of an improved process for the more efficient recovery of the metal halide constituents from fluid mixtures comprising metal halides of the Friedel-Crafts type.

A still further object of the invention is the provision of an improved process for the more efficient recovery of the aluminum halide content from at least partly spent aluminum chloride-containing catalysts and catalyst residues obtained in the treatment of hydrocarbons with the aid of aluminum halide-containing catalysts. Other objects and advantages of the invention will become apparent from the following detailed description thereof.

In accordance with the invention, continuous recovery within the system of the metal halide component from at least partly spent catalysts or catalyst residues which are produced within a process wherein hydrocarbons are contacted with a catalyst comprising a metal halide of the Friedel-Crafts type, is obtained by the passage of the at least partly spent catalyst or catalyst residue, substantially as rapidly as formed, into a distillation zone. Within the distillation zone the spent catalyst is subjected to a temperature sufficiently high to effect the formation of a vaporous product comprising the metal halide. The vaporized products are passed directly from the distillation zone into a catalyst recovery zone, wherein they are contacted with a flow of a suitable liquid medium under conditions effecting the condensation and/or solution of the metal halide in the liquid. The resulting liquid enriched with the recovered metal halide is passed from the catalyst recovery zone to the reaction zone. The liquid medium is separated from reactor effluence and recycled to the catalyst recovery zone. Liquid media suitable for utilization within the catalyst recovery zone comprise, for example, a part of the fluid catalyst used in the system, catalyst residue formed within the system, a hydrocarbon or hydrocarbon fraction, a part of the feed to the system, molten salts, etc. The liquid may, furthermore, consist in part or in its entirety of a liquid which is inert under the conditions of execution of the process and which functions solely as a carrying medium for the recovered metal halide from the catalyst recovery zone to the reaction zone. In such operations the carrying liquid is separated from the reactor effluence and continuously recycled through the catalyst recovery and reaction zones. Such inert liquids may comprise, in the case of hydrocarbon conversions, molten salts, halogenated hydrocarbons, paraffin hydrocarbons or paraffinic hydrocarbon fractions differing in boiling range from the material being treated, $SO_2$, $CS_2$, etc.

In a preferred embodiment of the invention the at least partly spent catalyst or catalyst residue is subjected to a solvent treatment or extraction within the system prior to the distillation operation. Suitable solvents in processes treating or converting hydrocarbons comprise a hydrocarbon or hydrocarbon fraction available within the system, for example, a portion of the feed. By the scrubbing, at least a substantial part of the free metal halide constituent of the at least partly spent catalyst or catalyst residue is removed therefrom prior to passage of the latter to the distillation zone.

In order to set forth more fully the nature of the invention without, however, intending to limit the scope of the catalytic treatments or conversions to which it may be applied, it will be described in detail herein in its application to the isomerization of hydrocarbons with reference to the attached drawing, wherein the single figure shows a more or less diagrammatical elevational view of one form of apparatus suitable for the execution of the invention.

An isomerizable saturated hydrocarbon such as, for example, butane from any suitable source, is forced by means of pump 1 through valved line 2 into an intermediate part of an extraction zone. The extraction zone may consist of a column 3 provided with suitable packing material, baffles or the like. Within column 3 the butane is contacted in the liquid phase with a portion of at least partly spent catalyst emanating at least in part from the reaction zone as described more fully below. Liquid butane comprising extracted catalyst components is passed from column 3 through valved line 4 and heat exchanger 5 into a reaction zone. The reaction zone may consist of a suitable reactor 6 provided with stirring means 7 and a separating chamber 8. Within reactor 6 the butane is contacted with a suitable isomerization catalyst comprising a metal halide of the Friedel-Crafts type and preferably a fluid type catalyst comprising a halide of aluminum. A particularly efficient isomerization catalyst comprises, for example, a molten mixture of antimony halide and an aluminum halide. A molten mixture of aluminum chloride and a molten mixture of $AlCl_3$ and $SbCl_3$ containing from about 3 to about 24 mol percent of aluminum chloride is highly suitable. It is to be understood, however, that the invention is in no wise limited to a specific catalyst of the molten salt type and other catalyst melts may be employed including, for example, any of the following molten mixtures: aluminum chloride-sodium chloride-potassium chloride, aluminum chloride-sodium chloride-zinc chloride, aluminum chloride-sulfur dioxide-zinc chloride, aluminum chloride-sodium chloride-potassium chloride-zinc chloride, etc. A part or all of the halide components of the catalyst may comprise halides other than the chlorides, for example, the bromides.

The temperature to be maintained within reaction chamber 6 may vary in accordance with the particular hydrocarbon treated and catalyst used. In the isomerization of saturated hydrocarbons temperatures of, for example, from about 50° C. to about 300° C., and preferably from about 80° C. to about 200° C., are satisfactory. The temperature within reaction chamber 6 is controlled by judicious heat input or withdrawal from the butane stream by means of heat exchanger 5 and, if needed, by additional heating means not shown in the drawing. The isomerization reaction is preferably executed in the presence of a hydrogen halide such as, for example, hydrogen chloride. The hydrogen chloride is introduced into the charge flowing through line 4 by means of line 10. Under these conditions butane will be converted to isobutane within reactor 6.

The isomerization reaction may be executed in the vapor or liquid phase. When operating in the liquid phase a pressure at least sufficiently high is maintained within reactor 6 to complete at least a substantial part of the butane in the liquid phase.

Within separating chamber 8 a substantial degree of separation between catalyst melt and hydrocarbon will be effected. The supernatant hydrocarbon layer, which in general will comprise some admixed or dissolved catalyst, is withdrawn from separator 8 and passed through line 9 into a vaporizing zone. The vaporizing zone may suitably consist of the lower part of a column 12, an intermediate part of which is provided with suitable packing means, baffles or the like. Within column 12 separation of hydrocarbons from entrained catalyst components is effected with the aid of heating coil 13. Since antimony chloride is relatively volatile, its separation from the hydrocarbon within column 12 is aided by the introduction of cold hydrocarbon reflux into the upper part of the column by means of valved line 14. Vapors, comprising isobutane, unconverted normal butane and hydrogen chloride promoter, are passed from the upper part of column 12 through line 16 and cooler 17 into an accumulator 18. In passing through cooler 17 the stream is cooled to a temperature sufficiently low to effect the condensation of butanes.

From accumulator 18 liquid comprising isobutane and normal butane is forced by means of pump 20 through line 21 into a stripping column 22. Uncondensed gases and vapors may be separately withdrawn from accumulator 18 through valved line 23 and passed in part or in their entirety by means not shown in the drawing to column 22. Within stripping column 22 the hydrogen chloride promoter is separated from the hydrocarbon material and removed therefrom through valved line 25. A portion or all of the hydrogen halide promoter passing through line 25 is recycled through valved line 10 to line 4. Make-up hydrogen chloride is introduced into line 10 from an outside source by means of valved line 26. A liquid fraction comprising normal butane and isobutane is passed through valved line 27 into a fractionator 28. Within fractionator 28 a liquid fraction comprising normal butane is separated from a vapor fraction comprising isobutane. The liquid fraction is withdrawn from column 28 through valved line 29 and forced in part or in its entirety through valved line 30 to the isomerization zone. The vapor fraction is removed overhead from column 28 through valved line 31 as a final product.

During the course of the process a certain portion of the catalyst will become spent. The spent catalyst generally comprises sludgy aluminum chloride-hydrocarbon complexes formed by the interaction of aluminum chloride with hydrocarbons of the feed or formed as the result of undesirable side reactions. The presence of this sludge in even relatively small amounts has a decided detrimental effect upon the catalyst melt as a whole. Maintenance of a high level of catalyst activity is attained by the substantially continuous elimination of the sludge or spent catalyst from the system by continuously passing at least a portion of the catalyst phase separated in catalyst separator 8 through valved lines 35 and 36 into the upper part of column 3. The portion of at least partly spent catalyst thus introduced into column 3 will pass countercurrently to the upward flowing butane charge. In its passage through column 3 active, free catalyst components comprising antimony chloride and aluminum chloride are dissolved in the butane stream and passed therewith to reactor 6. The remaining portion of the at least partly spent catalyst comprising components which are at least partly spent with respect to their ability to catalyze the isomerization reaction remains insoluble in the butane stream and is separated as a heavier fluid catalyst residue. The fluid catalyst residue will generally consist predominantly of aluminum chloride-hydrocarbon complexes. The hydrocarbon charge to the system is preferably preheated, for example, with the aid of a suitable heat exchanger 37 to a temperature favorable to the extraction operation. This temperature will vary with the nature of the material being treated and the particular catalyst used. In the treatment of paraffinic hydrocarbons temperatures in the approximate range of from about 50° C. to about 125° C. and preferably from about 50° C. to about 100° C. are found suitable. The pressure within column 3 is always sufficiently high to maintain at least a substantial portion of the hydrocarbon stream passing therethrough in the liquid phase.

It has been found that the fluid catalyst residue separated within extractor 3 will comprise any hydrocarbon-aluminum chloride complexes formed within reactor 6. It has also been found that this material is substantially insoluble in the hydrocarbon feed which contributed to its formation and will not undergo decomposition or disintegration to any substantial degree in the extraction zone, whereas the still active antimony chloride-aluminum chloride catalyst possesses an appreciable degree of solubility in the normal butane. The composition of the fluid catalyst residue separated within column 3 will vary to some degree with the nature of the material treated and operating conditions used.

The efficiency with which the separation of active free catalyst components are separated from the spent catalyst comprising aluminum chloride-hydrocarbon complexes in scrubbing column 3 is exemplified by the following example:

*Example I*

Partly spent catalyst obtained in the isomerization of butane with a fluid catalyst melt consisting of $AlCl_3$ dissolved in $SbCl_3$, drawn from the catalyst separator (separator 8) of the system was found to have the following composition:

| | Weight per cent |
|---|---|
| $AlCl_3$ | 7.3 |
| $SbCl_3$ | 88.3 |
| $FeCl_2$ | 0.7 |
| Carbon | 2.0 |
| Excess Cl— | 1.3 |

The partly spent catalyst was introduced into the top of the scrubbing tower (column 3) and contacted countercurrently therein with preheated liquid butane. During the scrubbing operation the greater part of free $SbCl_3$—$AlCl_3$ was dissolved in the butane, leaving a fluid catalyst residue which was drawn from the lower part of the scrubbing tower (column 3) and which consisted of a mixture consisting essentially of hydrocarbon-aluminum chloride complexes, and which had the following composition:

| | Weight per cent |
|---|---|
| $AlCl_3$ | 53.2 |
| $SbCl_3$ | 3.2 |
| $FeCl_2$ | 1.5 |
| Carbon | 20.8 |
| Excess Cl— | 5.3 |
| Undetermined | 16.0 |

The fluid catalyst residue separated in column 3, as is apparent from the foregoing example, contains a considerable proportion of valuable aluminum chloride. The rate at which catalyst is withdrawn from separating chamber 8 and passed to the upper part of extractor 3 may vary within the scope of the invention. As pointed out, however, it is highly advantageous to effect the catalyst withdrawal at a rate sufficiently great to prevent the accumulation to any substantial degree of even partially spent catalyst within the reactor. The amount of catalyst residue thus accumulated in operation of the plant at a high level of catalyst activity will therefore generally be sufficiently great to seriously detract from efficient operation of the process unless the aluminum chloride be recovered therefrom. Recovery must not only be high but continuous to enable the maintenance of optimum catalyst composition in the system without recourse to excessive amounts of make-up aluminum chloride from an outside source.

In accordance with the invention continuous and highly efficient catalyst recovery is effected within the system by forcing the catalyst residue from column 3 through valved lines 39 and 40 into a distillation zone. The distillation zone may comprise a still 41 positioned in a furnace structure 42. It has been found that by the judicious application of heat the catalyst residue charged to the still is converted to a vaporous product comprising hydrocarbons, sublimed aluminum chloride and a carbonaceous residue. Heating of the catalyst residue at a temperature of, for example, from about 200° C. to about 500° C., and preferably from about 350° C. to about 400° C. has been found suitable. A worm or screw 43, or similar device, is provided to move the coky residue within the still to outlet 44 whence it is eliminated from the system. Under these conditions at least a substantial part of the aluminum chloride is recovered in the vaporous products. The hydrocarbons comprised in these products are found to consist predominantly of light paraffinic compounds, free of any intermediate hydrocarbons of a nature capable of interfering with efficient recovery of the aluminum chloride.

The catalyst residue removed from scrubber 3 will generally possess sufficient fluidity even at ordinary temperatures to permit its passage without difficulty to the distillation zone. If desired, however, a portion of the butane feed to the system may be diverted from line 2 and forced through valved lines 46 and 47 into line 40 to further dilute the sludge flowing therethrough.

The excellent recovery of high purity aluminum chloride from the catalyst residue is evidenced by the following. Catalyst residues, taken from the bottom of scrubbing column 3 during a series of large scale butane isomerization operation with a fluid catalyst melt, consisting of $AlCl_3$ dissolved in $SbCl_3$, under conditions substantially as described, and having the composition indicated in Table A were subjected to distillation temperatures. The amount of aluminum chloride recovered in the vaporous product, coky residue obtained, and maximum still temperatures employed are indicated in Table B.

*Table A*

| Analysis weight per cent of catalyst residue charged to still— | 1 | 2 | 3 | 4 |
|---|---|---|---|---|
| Sb as SbCl₃ | 0.6 | 0.4 | 0 | 0 |
| Al as AlCl₃ | 63.4 | 67.4 | 62 | 62 |
| C as (CH₂)ₓ | | 18.2 | 29 | 29 |
| Fe as FeCl₃ | 3.9 | 2.0 | 2.1 | 2.1 |
| Excess chloride | | | 5.2 | 5.2 |

*Table B*

| Recovery | 1 | 2 | 3 | 4 |
|---|---|---|---|---|
| Weight per cent of AlCl₃ in total charge | 75.3 | 74.3 | 63 | 72 |
| HCl as weight per cent of total charge | | | 6.6 | 6.8 |
| Coky residue weight percent of total charge | 26.7 | 22.7 | 39 | 36 |
| Maximum still temperature, °C | | 400 | 405 | 400 |

Vapors comprising sublimed aluminum chloride and hydrocarbons are passed from still 41 through conduit 48 into a catalyst recovery zone. The catalyst recovery zone may comprise a suitable enlarged chamber or tower 49 optionally provided with suitable baffles or the like. Within catalyst recovery tower 49 the vapors are brought into contact with a downwardly flowing stream of a suitable liquid medium, for example, a molten salt such as antimony trichloride which is introduced into the upper part of the column through valved line 50. In a preferred method of executing the process of the invention at least a part of the liquid fraction separated in column 12 and consisting predominantly of antimony trichloride is passed from the lower part thereof through valved lines 52 and 50 into the upper part of column 49. In its downward passage through column 49 the aluminum chloride emanating from still 41 is dissolved in the antimony trichloride stream and the resulting antimony trichloride-aluminum chloride mixture is passed from column 49 through valved lines 53 and 54 into reactor 6. In this wise the aluminum chloride removed from the reaction zone with the spent catalyst is continuously returned to the reaction zone assuring the maintenance of substantially constant catalyst composition within the reaction zone with the need of but a comparatively small amount of make-up AlCl₃ from an outside source. Aluminum chloride from an outside source is introduced into the system as required by means depicted figuratively in the drawing by valved lines 55 and 55a. A valved line 56 passing from line 52 directly into line 54 is provided for the passage of a part or all of the antimony trichloride fraction from column 12 directly to reactor 6.

Although antimony trichloride because of its low melting point and the appreciable solubility of aluminum chloride therein is particularly advantageous as a liquid suitable for recovering the sublimed aluminum chloride, it is to be pointed out that the process of the invention is in no wise limited to the use of a particular molten salt and other molten salts or mixtures thereof, possessing sufficiently low melting point and no adverse effect upon catalyst or reactants under execution of the process, may suitably be used. The invention is, furthermore, not limited to the use of molten salts as the medium for conveying the recovered aluminum chloride, and any suitable liquid, inert or possessing no disadvantageous effect upon reactants or catalyst under the conditions of operation, may be used.

If desired, a part or all of the liquid medium introduced into the catalyst recovery tower 49 may comprise a part of the fluid catalyst. This may be withdrawn from any suitable point in the reaction zone and passed directly to the top of column 49. The catalyst is, however, preferably taken from the catalyst layer, separated out in catalyst separator 8 by judicious manipulation of valves 57 and 58. A portion of the catalyst layer from catalyst separator 8 is thus passed through lines 35, 52 and 50 into the upper part of column 49, while another portion of the catalyst layer is passed through lines 35 and 36 to the top of scrubbing column 3. If desired, a part or all of the liquid introduced into the upper part of column 49 may comprise a part of the hydrocarbon charge to the system. Such portion of the hydrocarbon charge is diverted from line 2 and passed through lines 46, 52 and 50 into the upper part of the catalyst recovery column, or may be diverted from line 4, through valved line 60. When a hydrocarbon or a hydrocarbon mixture other than the hydrocarbon charge is used as the carrying liquid for the recovered aluminum chloride, these are separated from the reaction products by any suitable means comprising, for example, fractionation, extractive distillation, solvent extraction or any other step not shown in the drawing. When a hydrocarbon or hydrocarbon mixture higher boiling than the hydrocarbons being treated or converted is used as the liquid introduced into the column 49, this is recovered from the reaction effluent together with entrained antimony trichloride as bottoms in column 12 and the resulting mixture, or a portion thereof, returned to the catalyst recovery tower.

Vapors, comprising hydrocarbons, inert gas and hydrogen chloride not condensed in column 49 are eliminated overhead therefrom through valved line 51. The following is the analysis of the acid-free gas evolved during the distillation of the catalyst residue number 4 of the above Table A.

Gas analysis: mol percent
  Hydrogen _____ 5.7
  C₁ to C₃ saturated hydrocarbons _____ 66.2
  Ethylene _____ 0.4
  Propylene _____ 0.0
  Butylenes _____ 0.2
  Butanes _____ 22.4
  Higher boiling than butane _____ 5.1

The evolved gas is substantially paraffinic and contains a considerable proportion of butane which, together with the recovered hydrogen chloride, is preferably recycled to the conversion zone thereby further utilizing material heretofore eliminated in the catalyst residue. Vapors and gases leaving column 49 through valved line 51 are forced in part or in their entirety through line 61 leading into line 16. If desired, the overhead from column 49 may be passed by means not shown in the drawing from line 51 to charge line 2. The latter has the advantage of eliminating any olefin content of the gas by contact with at least partly spent catalyst in column 3.

Although the molten salt type catalysts have been stressed in the illustrative description of the invention, it is to be understood that the invention is in no wise limited in its application to catalysts of this particular type. When executing hydrocarbon conversions with the aid of catalysts other than the molten salt type such as, for example, catalysts comprising or consisting essentially of organo-metal halide complexes, a part of the catalyst layer separated in catalyst separator 8 is continuously passed therefrom into extraction column 3, while another portion thereof, taken either from the reaction zone, catalyst separator 8 or column 12 or from more than one of these points, is passed into the upper part of column 49 substantially as described above. At times it may be desirable, particularly when utilizing fluid catalysts of the organo-metal halide complex type to pass spent or partly spent catalyst separated from the reaction products directly into still 41. To this effect a valved line 62 is provided enabling the passage of a portion of the catalyst layer from separator 8 into still 41.

The invention thus enables the more efficient execution of catalytic conversions with the aid of catalysts comprising metal halides of the Friedel-Crafts type under conditions providing for the substantially continuous elimination of spent catalyst from the system substantially as rapidly as formed, with simultaneous continuous and substantially complete recovery of the metal halide content of the spent catalyst and its continuous return into the system, thereby enabling maintenance of a high level of catalyst activity over far greater periods of operation with a minimum requirement of make-up catalyst from an outside source.

We claim as our invention:

1. In a catalytic hydrocarbon conversion process wherein hydrocarbons are converted by contact with a fluid catalyst melt comprising antimony trichloride and aluminum chloride at conversion conditions in a conversion zone, and a liquid fraction comprising entrained antimony trichloride is separated from reaction products, the steps which comprise withdrawing a portion of at least partly spent catalyst from said conversion zone, scrubbing said portion of catalyst with the hydrocarbons to be converted in a scrubbing zone, thereby separating catalyst components by solution from a fluid catalyst residue consisting essentially of aluminum chloride-hydrocarbon complexes, passing hydrocarbons comprising dissolved catalyst components from the scrubbing zone to the conversion zone, passing said fluid catalyst residue from said scrubbing zone into a distillation zone, maintaining a temperature sufficiently high in said distillation zone to convert said catalyst residue into vapors comprising aluminum chloride and a coky residue, contacting said vapors with said liquid fraction comprising entrained antimony trichloride separated from reaction products thereby dissolving aluminum chloride in said liquid fraction, and passing the resulting liquid comprising antimony trichloride and dissolved aluminum chloride to said conversion zone.

2. In a catalytic hydrocarbon conversion process wherein hydrocarbons are converted by contact with a fluid catalyst melt comprising a halide of antimony and a halide of aluminum at conversion conditions in a conversion zone, and a liquid fraction comprising entrained antimony halide is separated from reaction products, the steps which comprise withdrawing a portion of at least partly spent catalyst from said conversion zone, scrubbing said portion of catalyst with the hydrocarbons to be converted in a scrubbing zone, thereby separating catalyst components comprising antimony halide by solution from a fluid catalyst residue consisting essentially of aluminum halide-hydrocarbon complexes in the scrubbing zone, passing hydrocarbons comprising dissolved catalyst components from the scrubbing zone to the conversion zone, passing said fluid catalyst residue from said scrubbing zone into a distillation zone, maintaining a temperature sufficiently high in said distillation zone to convert said catalyst residue into vapors comprising aluminum halide and a coky residue, contacting said vapors with at least a portion of said liquid fraction comprising entrained antimony halide separated from the reaction products thereby condensing aluminum halide, and passing the resulting liquid comprising antimony halide and condensed aluminum halide to said conversion zone.

3. In a catalytic hydrocarbon conversion process wherein hydrocarbons are converted by contact with a fluid catalyst comprising a halide of aluminum at conversion conditions in a conversion zone, effluence from the conversion zone is passed into a vaporizing zone, and a liquid fraction comprising entrained catalyst is separated from hydrocarbon reaction products in said vaporizing zone, the steps which comprise withdrawing a portion of at least partly spent catalyst from said conversion zone, scrubbing said portion of at least partly spent catalyst withdrawn from the conversion zone with the hydrocarbons to be converted in a scrubbing zone, thereby separating active catalyst components by solution from a fluid aluminum halide-containing catalyst residue in said scrubbing zone, passing hydrocarbons to be converted comprising dissolved catalyst components from the scrubbing zone to the conversion zone, passing said fluid catalyst residue from the scrubbing zone into a distillation zone, maintaining a temperature sufficiently high in said distillation zone to convert said catalyst residue into vapor comprising aluminum halide and a coky residue, passing said liquid fraction from said vaporizing zone into contact with said vapors comprising aluminum halide in said distillation zone, thereby condensing aluminum halide and passing the resulting liquid comprising condensed aluminum halide from said distillation zone to said conversion zone.

4. In a catalytic hydrocarbon conversion process wherein hydrocarbons are converted by contact with a fluid catalyst comprising a metal hadide of the Friedel-Crafts type at conversion conditions in a conversion zone, effluence from the conversion zone is passed into a vaporizing zone, and a liquid fraction comprising entrained catalyst is separated from hydrocarbon reaction products in said vaporizing zone, the steps which comprise withdrawing a portion of at least partly spent catalyst from said conversion zone, scrubbing said portion of at least partly spent catalyst withdrawn from the conversion zone with the hydrocarbons to be converted in a scrubbing zone, thereby separating active catalyst components by solution from a fluid metal halide-containing catalyst residue in said scrubbing zone, passing hydrocarbons to be converted comprising dissolved catalyst components from the scrubbing zone to the conversion zone, passing said fluid catalyst residue from the scrubbing zone in to a distillation zone, maintaining a temperature sufficiently high in said distillation zone to convert said catalyst residue into vapors comprising metal halide and a coky residue, passing said liquid fraction from said vaporizing zone into contact with said vapors comprising metal halide in said distillation zone, thereby condensing metal halide, and passing the resulting liquid comprising condensed metal halide from said distillation zone to said conversion zone.

5. In a catalytic hydrocarbon conversion process wherein hydrocarbons are converted by contact with a fluid catalyst melt comprising antimony trichloride and aluminum chloride at conversion conditions in a conversion zone, the steps which comprise withdrawing a portion of at least partly spent catalyst from said conversion zone, scrubbing said portion of catalyst with the hydrocarbons to be converted thereby separating catalyst components by solution from a fluid catalyst residue consisting essentially of aluminum chloride-hydrocarbon complexes in said scrubbing zone, passing hydrocarbons comprising dissolved catalyst components from the scrubbing to the conversion zone, passing said fluid catalyst residue from said scrubbing zone into a distillation zone, maintaining a temperature sufficiently high in said distillation zone to convert said catalyst residue into vapors comprising aluminum chloride and a coky residue, contacting said vapors with molten antimony trichloride thereby dissolving aluminum chloride in said antimony trichloride, and passing the resulting molten antimony trichloride comprising dissolved aluminum chloride to said conversion zone.

6. In a catalytic hydrocarbon conversion process wherein hydrocarbons are converted by contact with a fluid catalyst melt comprising antimony trichloride and aluminum chloride at conversion conditions in a conversion zone, the steps which comprise withdrawing a portion of at least partly spent catalyst from said conversion zone, scrubbing said portion of catalyst withdrawn from the conversion zone with the hydrocarbons to be converted thereby separating catalyst components by solution from a fluid catalyst residue consisting essentially of aluminum chloride-hydrocarbon complexes in said scrubbing zone, passing hydrocarbons comprising dissolved catalyst components from the scrubbing zone to the conversion zone, passing said fluid catalyst residue from said scrubbing zone into a distillation zone, maintaining a temperature sufficiently high in said distillation zone to convert said catalyst residue into vapors comprising aluminum chloride and a coky residue, contacting said vapors with fluid melt comprising antimony trichloride and aluminum chloride thereby condensing aluminum chloride, and passing the resulting fluid melt comprising the condensed aluminum chloride from the distillation zone to said conversion zone.

7. In a catalytic hydrocarbon conversion process wherein hydrocarbons are converted by contact with a fluid catalyst melt comprising a halide of aluminum and a halide of antimony at conversion conditions in a conversion zone, and reactor effluence is passed into a product separating zone, the steps which comprise separately withdrawing a portion of at least partly spent catalyst from said conversion zone, passing said portion of partly spent catalyst withdrawn from the conversion zone into a distillation zone, maintaining a temperature sufficiently high in said distillation zone to convert said portion of at least partly spent catalyst into vapors comprising aluminum halide and a coky residue, contacting said vapors with a fluid melt comprising antimony halide, thereby dissolving aluminum halide in said melt, and passing the resulting fluid melt comprising dissolved aluminum halide to said conversion zone.

8. In a process of treating at least partly spent fluid catalysts comprising hydrocarbon-aluminum halide complexes and uncombined catalyst components comprising aluminum halide, the steps which comprise scrubbing said catalyst with a paraffinic hydrocarbon solvent, thereby separating catalyst components comprising aluminum halide by solution from a fluid catalyst residue comprising aluminum halide-hydrocarbon complexes, subjecting said catalyst residue to a sufficiently elevated temperature to produce a vapor comprising aluminum halide and a coky residue, and contacting said vapor with a melt comprising a halide of antimony, thereby dissolving said aluminum halide in said melt.

9. In a process of treating at least partly spent fluid catalysts comprising hydrocarbon-aluminum halide complexes and uncombined catalyst components comprising aluminum halide, the steps which comprise scrubbing said catalyst with a paraffinic hydrocarbon solvent, thereby separating catalyst components comprising aluminum halide by solution from a fluid catalyst residue comprising aluminum halide-hydrocarbon complexes, subjecting said catalyst residue to a sufficiently elevated temperature to produce a vapor comprising aluminum halide and a coky residue, and contacting said vapor with the paraffinic hydrocarbon solvent comprising dissolved catalyst components obtained in said scrubbing operation thereby condensing aluminum halide vapors.

10. In a process of treating fluid mixtures comprising hydrocarbon-metal halide complexes and uncombined catalyst components comprising aluminum halide, obtained by contacting hydrocarbons with a catalyst comprising a metal halide of the Friedel-Crafts type at conversion conditions, to recover said metal halide, the steps which comprise scrubbing said fluid mixture with a paraffinic hydrocarbon solvent, thereby separating catalyst components comprising said metal halide by solution from a fluid residue comprising hydrocarbon-metal halide complexes, subjecting said residue to a sufficiently elevated temperature to produce a vapor comprising said metal halide and a coky residue, and contacting said vapor with the paraffinic hydrocarbon solvent comprising dissolved catalyst components obtained in said scrubbing operation, thereby condensing said metal halide vapors.

WILLIAM E. ROSS.
GEORGE J. CARLSON.